US012570898B2

(12) United States Patent
Lai

(10) Patent No.: US 12,570,898 B2
(45) Date of Patent: Mar. 10, 2026

(54) LUMINESCENT COMPOSITE MATERIAL, PRODUCTION METHOD AND LIGHT EMITTING DIODE THEREOF

(71) Applicant: Feng Chia University, Taichung City (TW)

(72) Inventor: Chun-Feng Lai, Taichung City (TW)

(73) Assignee: Feng Chia University, Taichung City (TW)

( * ) Notice: Subject to any disclaimer, the term of this patent is extended or adjusted under 35 U.S.C. 154(b) by 617 days.

(21) Appl. No.: 17/994,899

(22) Filed: Nov. 28, 2022

(65) Prior Publication Data

US 2024/0034928 A1     Feb. 1, 2024

(30) Foreign Application Priority Data

Jul. 24, 2022    (TW) .................................. 111127661

(51) Int. Cl.
*C09K 11/08*          (2006.01)
*C09K 11/02*          (2006.01)
(52) U.S. Cl.
CPC ............ *C09K 11/08* (2013.01); *C09K 11/025* (2013.01)
(58) Field of Classification Search
CPC .................................................... C09K 11/025
See application file for complete search history.

(56) References Cited

U.S. PATENT DOCUMENTS

| | | | | |
|---|---|---|---|---|
| 2010/0059743 A1* | 3/2010 | Jun | ............................ | C09C 1/10 257/E33.013 |
| 2013/0105854 A1* | 5/2013 | Jang | ............................ | C09C 3/10 252/519.2 |
| 2018/0273839 A1* | 9/2018 | Li | ............................ | C09K 11/025 |

FOREIGN PATENT DOCUMENTS

KR            10-1203173      * 11/2012

* cited by examiner

*Primary Examiner* — Matthew E. Hoban
(74) *Attorney, Agent, or Firm* — Best & Flanagan LLP

(57)              ABSTRACT

Present invention is related to a luminescent composite material having a luminescent material uniformly being coated by a coating. The luminescent material of the present invention comprises any suitable QDs or a fluorescent material and the coating contains Na-poly(Al—O—Si) nanocomposites. The present invention can provide a high thermal resistance and reliability performance by the outer layer. When applying to the backlight module, the present invention could efficiently increase the luminous efficiency and the color standard of LCD. When applying to the light emitting applications, the present invention could also improve its luminous efficiency and prolong the duration for the light emitting composite material. The production method of the composite in the present invention is simple and reliable which could be easily introduced into the market with great economic benefits and values. The present invention is a revolution and great achievement for improving the entertainment, medical diagnosis, and e-commerce technologies.

17 Claims, 16 Drawing Sheets

LUMINESCENT COMPOSITE MATERIAL, PRODUCTION METHOD AND LIGHT EMITTING DIODE THEREOF

This application claims the benefit of Taiwanese invention patent application No. 111127661 filed on Jul. 24, 2022, the entire contents of which are incorporated herein by reference.

FIELD OF INVENTION

The present invention is related to a luminescent composite material, especially to a luminescent composite material with a nanocomposite coating to increase reliability when applied to light emitting diodes (LEDs) such as quantum dot light emitting diodes (QD-LEDs).

The luminescent composite material of the present invention will be described hereinafter using quantum dots (QDs) or similar material as a preferred luminescent material with nanocomposites coating. However, the present invention is not intended to be limited to such a single application, any other suitable luminescent material may also be included in the claimed scope of the present invention.

BACKGROUND OF THE INVENTION

Quantum dots (QDs), or nano-quantum dots are artificial nanocrystals (NCs) with semiconductor properties having sizes typically ranging from 2 to 50 nm. QDs are a highly promising material and have been widely applied to optical devices or electronic devices in military, industry or medical fields with various commercialized products such as biomarkers, catalysis, optical imaging, light-emitting diodes (LEDs) and general illuminating applications.

One of the most promising applications of QDs is light-emitting diodes (LEDs). QDs readily absorb light emitted from LEDs and re-emit the light as white light source by combining or mixing with other suitable light wavelengths. Such white light source could be used as a back light or a single pixel of a display screen to greatly enhance a brightness and color (color gamut) performance of this application. QDs have became a major focus for commercial entertainment products development.

However, QDs are heat sensitive material and often suffer functional degradation due to the overheating of the device. Hence, it is eager to have a solution for providing a luminescent composite material to improve the heat resistance and reliability of QDs, particularly for an advanced liquid-crystal display (LCD) application that will overcome or substantially ameliorate at least one or more of the deficiencies of a prior art, or to at least provide an alternative solution to the problems. It is to be understood that, if any prior art information is referred to herein, such reference does not constitute an admission that the information forms part of the common general knowledge in the art.

SUMMARY OF THE INVENTION

In order to solve the disadvantages of the conventional QDs with poor heat resistance, low luminous efficiency and bad reliability, the present invention provides a luminescent composite material comprising: a luminescent material and a coating is coated at an outer surface of the luminescent material, wherein the coating is Na-poly(Al—O—Si) composite. The luminescent material includes quantum dots, quantum rods and/or fluorescent material.

In accordance, a second aspect of the present invention is a production method of the luminescent composite material as mentioned above. The said method comprises steps of: providing the luminescent material; adding the luminescent material into a reaction solution comprising Di-sec-Butoxyaluminoxytriethoxysilane (DBATES) and a sodium-containing catalyst; and stirring the reaction solution to synthesis Na-poly(Al—O—Si) composite as the coating from DBATES and the sodium-containing catalyst at the outer surface of the luminescent material to form the luminescent composite material.

In accordance, a third aspect of the present invention is a light emitting diode comprises the luminescent composite material as mentioned above. The said light emitting diode comprises steps of: a carrier; at least one chip deposited onto the carrier; the chip is enclosed by a matrix; wherein: a luminescent composite material as claimed in claim 1 is uniformly dispersed in the matrix deposited onto the carrier or is a film being laminated onto the carrier.

In accordance, the present invention has the following advantages:

1. The present invention provides a luminescent composite material having high heat resistance and reliability when applied to a commercial back light module. The luminescent composite material has proven to be able to increase the Rec. 2020 value of a liquid crystal display (LCD) screen to more than 90%. The Rec. 2020 value (ITU-R Recommendation BT.2020) is a standard for evaluating the color standard for ultra high definition television (UHDTV) regulated by the ITU Radiocommunication Sector (ITU-R).

2. The luminescent composite material of the present invention can efficiently improve the reliability of LEDs, more specifically QD-LEDs and has been proven to exceed the current international standard. The production method of the present invention is simple and fast, can be introduced to the market for commercial applications easily. The light emitting diode made by the present invention is able to emit high efficiency white light which can directly apply to white LEDs backlight module or any other final products on the market. The present invention can utilize QDs or other suitable fluorescent material to meet the requirements of high-end LCD television development. Compared to the conventional LCD television, the high-end LCD television using the present invention can provide up to 50% more color saturation to benefit the entertainment, medical diagnosis and e-commerce industrial applications.

3. The Na-poly(Al—O—Si) nanocomposite coating for QDs enhances the photoluminescence quantum yield by around 1.74-fold, as well as stability. The sol-gel method for producing the luminescent composite material of the present invention with the sodium-containing catalyst shows the lowest specific surface area (SSA) with almost no pore. This demonstrates the best reliability analysis result for QD-LEDs presenting a highly luminous efficacy of 133 lm W$^{-1}$ under an electric input power of 21.4 mW.

Many of the attendant features and advantages of the present invention will become better understood with reference to the following detailed description considered in connection with the accompanying figures and drawings.

BRIEF DESCRIPTION OF THE DRAWINGS

The steps and the technical means adopted by the present invention to achieve the above and other objects can be best understood by referring to the following detailed description of the preferred embodiments and the accompanying drawings.

DETAILED DESCRIPTION OF THE PREFERRED EMBODIMENTS

Figure 1:
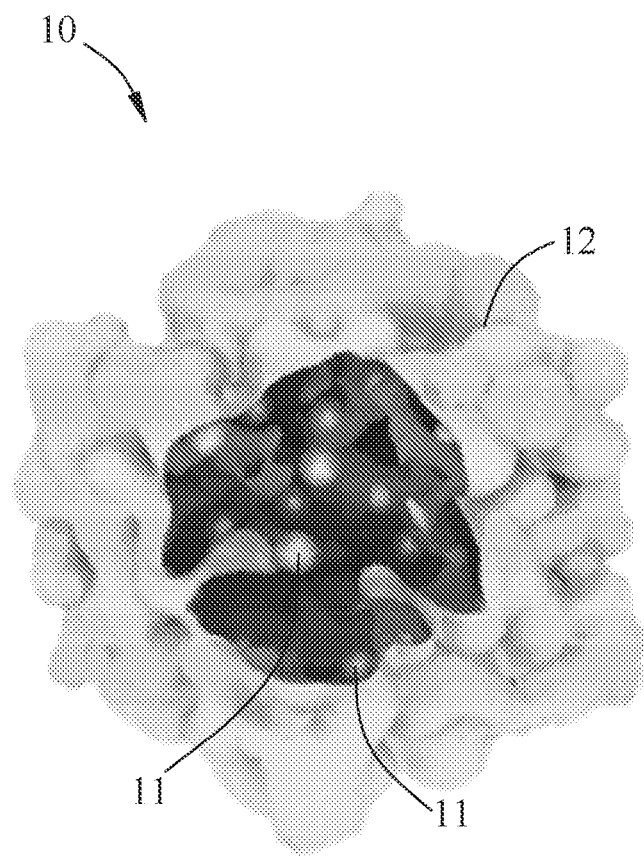
FIG. 1 is an illustration of a preferred embodiment of the luminescent composite material in accordance to the present invention.

Reference will now be made in detail to the present preferred embodiments of the invention, examples of which are illustrated in the accompanying drawings. Wherever possible, the same reference numbers are used in the drawings and the description to refer to the same or like parts. It is not intended to limit the method by the exemplary embodiments described herein. In the following detailed description, for purposes of explanation, numerous specific details are set forth in order to attain a thorough understanding of the disclosed embodiments. It will be apparent, however, that one or more embodiments may be practiced without these specific details. As used in the description herein and throughout the claims that follow, the meaning of "a", "an", and "the" may include reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to.

<Luminescent Composite Material>

With reference to FIG. 1, a first embodiment of the luminescent composite material 10 of the present invention comprises a luminescent material 11 and a coating 12 coated at an outer surface of the luminescent material 11. The luminescent material 11 is encapsulated by the coating 12 in a quantity of one or more. The luminescent material 11 comprises but not limited to quantum dots (QDs), quantum rods (QRs) both having sizes ranging from 2 to 50 nm or a fluorescent material. When multiple luminescent materials 11 are coated inside the coating 12, types of the luminescent materials 11 could be various including core only quantum dots, core-shell quantum dots or core-multiple shells quantum dots. The core only QDs comprises Cadmium Selenide (CdSe), Cadmium Sulfide (CdS), Cadmium Telluride (CdTe), Cadmium Zinc (CdZn), Zinc Selenide (ZnSe), Zinc Oxide (ZnO), Selenium Sulfide (SeS), Zinc Sulfide (ZnS), Zinc Telluride (ZnTe), Mercury sulfide (HgS), Mercury Selenide (HgSe), Mercury Telluride (HgTe), Indium Arsenide (InAs), Indium Phosphide (InP), Cesium Lead Halide (CsPbX$_3$, Cs$_4$PbX$_6$, where X represents Cl, Br or I) or combination thereof. The core-shell or core-multiple shells QDs May be but not limited to Cadmium Selenide/Cadmium Sulfide (CdSe/CdS), Indium Phosphide/Cadmium Selenide/Cadmium Sulfide (InP/CdSe/CdS), Cadmium Zinc/Selenium Sulfide/Zinc Sulfide (CdZn/SeS/ZnS), Indium Phosphide/Zinc Sulfide (InP/ZnS), Indium Phosphide/Zinc Selenide (InP/ZnSe), Indium Phosphide/Zinc Selenide/Zinc Sulfide (InP/ZnSe/ZnS), Indium Phosphide/Zinc Selenide/Zinc Selenium Sulfide/Zinc Sulfide (InP/ZnSe/ZnSeS/ZnS), Silver Indium Sulfide (AgInS$_2$), Silver Indium Sulfide/Zinc Sulfide (AgInS$_2$/ZnS) or combination thereof.

The fluorescent material comprises but not limited to the fluorescent material with visible and infrared (VIR) emission (400~700 nm wavelength), near-infrared light (NIR) emission or infrared light (IR) emission ability (700~2500 nm wavelength).

The fluorescent material with VIR emission ability comprises Yttrium Aluminum Garnet (Y$_3$Al$_5$O$_{12}$, YAG, yellow fluorescent powder), Lutetium Garnet (LuYAG, yellow-green fluorescent powder), Gallium Garnet (GaYAG, green fluorescent), Sulfide fluorescent powder (SrS:Eu$^{2+}$, SrGazS$_4$:Eu$^{2+}$, ZnS:Cu$^+$) or combination thereof.

The fluorescent material with NIR or IR emission ability comprises a host lattice, a activator and a sensitizer. The host lattice comprises a compound having one or any combination of the following formula 1 to 7:

$$EAGa_{12}O_{19} \hspace{2cm} \text{Formula 1,}$$

wherein; EA=Mg, Ca, Sr and/or Ba.

$$A_yGa_5O_{(15+y)} \hspace{2cm} \text{Formula 2,}$$

wherein A=Li, Na, K and/or Rb, and y=0.9-1.9.

$$AE_3Ga_2Ge_4O_{14} \qquad \text{Formula 3,}$$

wherein AE=Mg, Ca, Sr and/or Ba.

$$Ln_3Ga_5GeO_{14} \qquad \text{Formula 4,}$$

wherein Ln=La, Ce, Pr, Nd, Pm, Sm, Eu, Gd, Tb, Dy, Ho, Er, Tm, Yb and/or Lu.

$$Ga_2O_3 \qquad \text{Formula 5.}$$

$$Ln_3Ga_{5.5}D_{0.5}O_{14} \qquad \text{Formula 6,}$$

wherein D=Nb, Ge, and/or Ta.

$$Mg_4D_2O_9 \qquad \text{Formula 7.}$$

The activator and the sensitizer comprise metal ions including but not limited to $Cr^{3+}$, $Yb^{3+}$, $Ni^{2+}$, $Tb^{3+}$, $Er^{3+}$ and/or $Tm^{3+}$.

Furthermore, the fluorescent material with NIR or IR emission ability may also comprise $K_3AlF_6:Cr^{3+}$, $MgO:Cr^{3+}:Ni^{2+}$, $La_3Ga_5GeO_{14}:Cr^{3-}$, $Sc_{0.98}BO_3:Cr^{3+}$ and/or $K_3GaF_6:Cr^{3+}$.

The coating 12 comprises Na-poly(Al—O—Si) composite coating or more preferably Na-poly(Al—O—Si) nanocomposites coating on the outer surface of one or more luminescent material 11 to form the luminescent composite material 10 in the present invention. A thickness of the coating 12 is preferred to be at a range of 80 nm to 49.5 μm, or more preferably in a range of 100 nm to 50 μm, by adjusting the quantity of each component or ingredient for producing the luminescent composite material 10.

<Production Method for Producing the Luminescent Composite Material>

Figure 2:
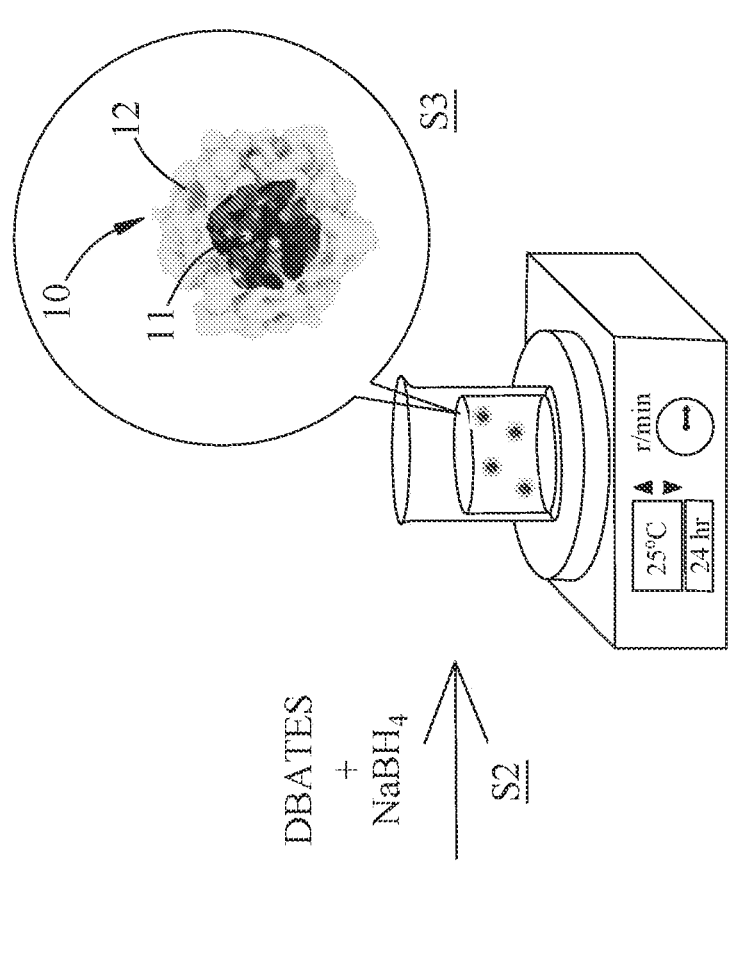
FIG. 2 is a flow chart for producing a preferred embodiment of the luminescent composite material in accordance to the present invention.
Figure 2:
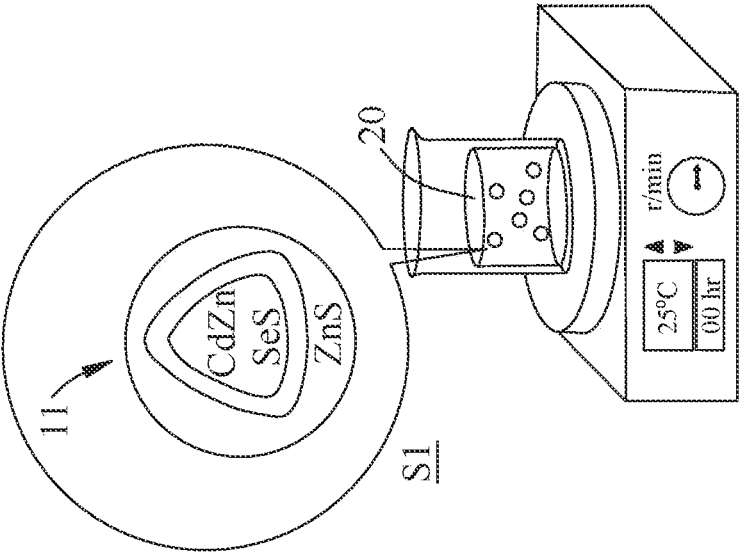

With reference to FIG. 2, a preferred embodiment for producing the luminescent composite material 10 of the present invention is a sol-gel method with catalyst. The method comprises the following steps:

S1) providing the luminescent material 11;

S2) adding the luminescent material 11 into a reaction solution 20 comprising Di-sec-Butoxyaluminoxytriethoxysilane (DBATES) and a sodium-containing catalyst; wherein a mole ratio of the DBATES and the sodium-containing catalyst in the reaction solution 20 is preferred to be in a range of 1~1000 mmol: 1~2000 mmol. The mole ratio of these two components (also referred to as the relative concentration between these two components) can result in different particle size of the luminescent composite material 10. For instance, a mole ratio of 10~1000 mmol: 20~2000 mmol is preferred to produce a bigger granule or particle for the luminescent composite material 10. To produce a smaller granule or particle for the luminescent composite material 10, a mole ratio of 10~100 mmol: 1~20 mmol is preferred.

S3) stirring the reaction solution 20 to synthesize Na-poly (Al—O—Si) composite as the coating 12 from DBATES and the sodium-containing catalyst at the outer surface of the luminescent material 11.

A reaction temperature for step S3 is preferred to be in a range of 15 to 40° C., or more preferred to be in a range of 20 to 35° C. A reaction time for step S3 is preferred to be in a range of 10 to 96 hours, or more preferred to be at a range of 15 to 50 hours. In one preferred embodiment, the reaction temperature for step S3 may be 25° C. and the reaction time for step S3 May be 24 hours. The reaction temperature and the reaction time have a direct relationship for the thickness and density of the coating 12.

The sodium-containing catalyst comprises Sodium hydroxide (NaOH), Sodium tetrahydridoborate ($NaBH_4$) or Sodium metaborate ($NaBO_2$).

<Preferred Applications of the Luminescent Composite Material>

Figure 3:
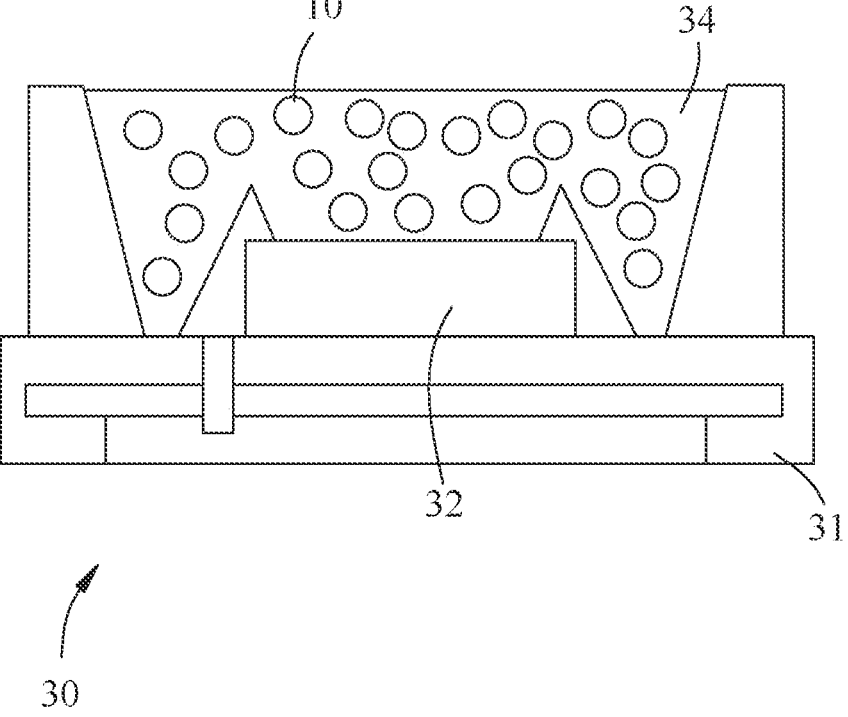
FIG. 3 is an illustration of a first preferred embodiment of a light emitting diode using the luminescent composite material in accordance to the present invention.

With reference to FIG. 3, the luminescent composite material 10 of the present invention can be applied to one of the preferred application which is a light emitting diode 30, such as QD white light-emitting diodes (QD-WLEDs). In this first embodiment of such light emitting diode 30, it comprises a carrier 31, at least one chip 32 disposed onto the carrier 31 and being enclosed by a matrix 34. The luminescent composite material 10 is uniformly dispersed in the matrix 34. In this preferred embodiment, the luminescent material 11 is QDs and the coating 12 is Na-poly(Al—O—Si) to form QDs@Na-poly(Al—O—Si) as the luminescent composite material 10. One of the preferred embodiments of the carrier 31 could be plastic chip carrier (PLCC), or more preferred to be Plastic Leaded Chip Carrier (PLCC). The matrix in the embodiment may be Silicone Resin.

Figure 4:
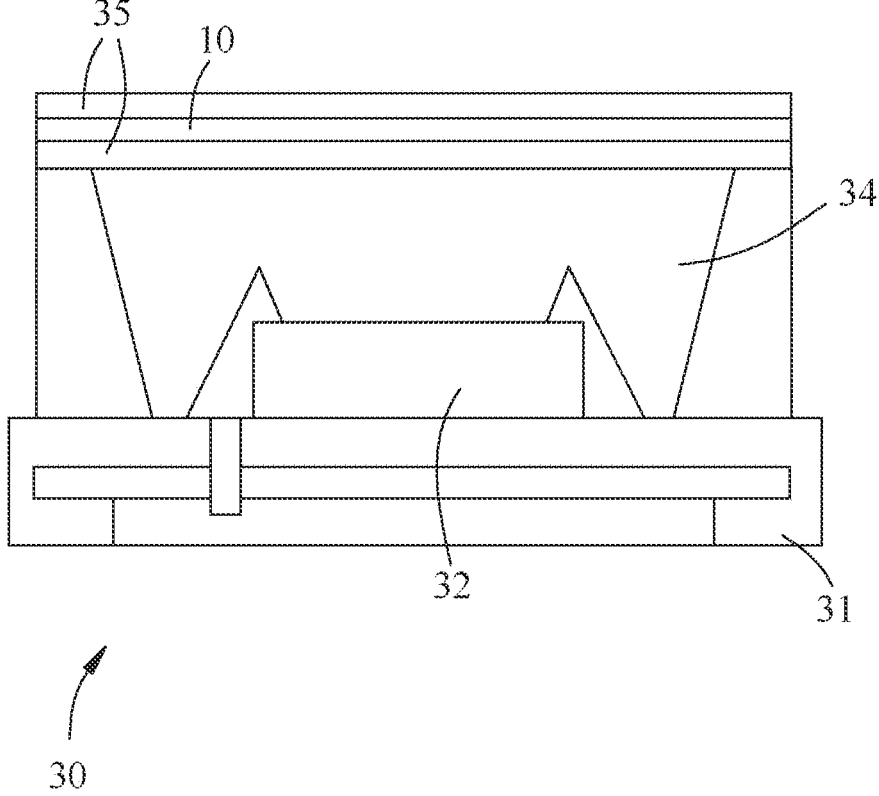
FIG. 4 is an illustration of a second preferred embodiment of a light emitting diode using the luminescent composite material in accordance to the present invention.

With reference to FIG. 4, a second embodiment of the light emitting diode 30 in the present invention is presented. Instead of dispersing the luminescent composite material 10 in the matrix 34, the composite material is formed as a film (using any suitable plastic) and laminated onto the matrix 34. The chip 32 is also enclosed by the matrix 34 same as the first embodiment as mentioned above. Further, a barrier layer 35 is preferred to be laminated between the matrix 34 and the film containing with the luminescent composite material 10. Additional barrier layer 35 may also further cover on a top of the film containing with the luminescent composite material 10 in this preferred embodiment shown in FIG. 4.

Figure 5:
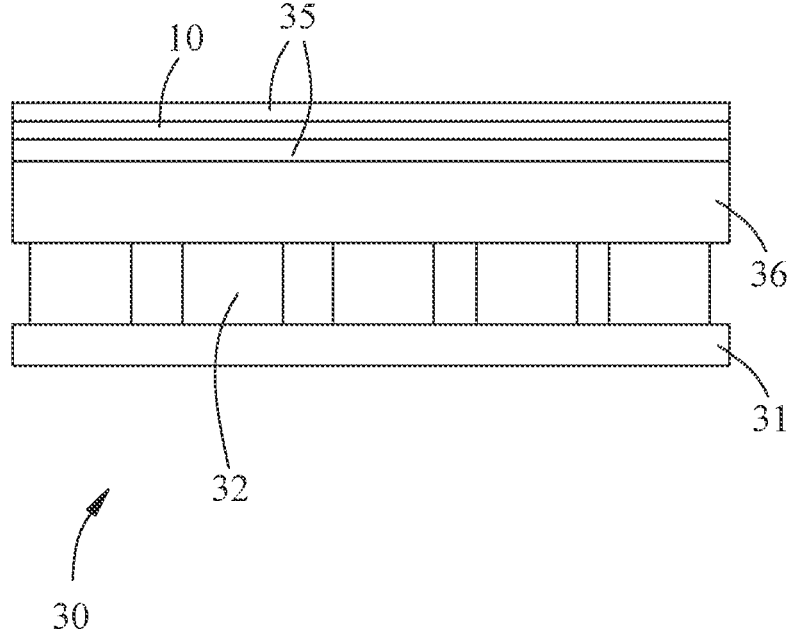
FIG. 5 is an illustration of a third preferred embodiment of a light emitting diode using the luminescent composite material in accordance to the present invention.

With reference to FIG. 5, a third embodiment of the light emitting diode 30 in the present invention is presented. In this preferred embodiment, multiple chips 32 are disposed onto the carrier 31 without enclosed by the matrix 34. The luminescent composite material 10 film as mentioned in previous embodiment is further laminated onto the multiple chips 32 with a liquid crystal display (LCD) module and more preferably the barrier 35 laminated in between. Additional barrier layer 35 may also further cover on a top of the film containing with the luminescent composite material 10 in this preferred embodiment shown in FIG. 5.

The above mentioned light emitting diode 30 are some preferred embodiment of a QD-on chip LED package. However, the present invention can be applied to all kinds of currently exist commercial LED packages. The particle size of the luminescent composite material 10 used in the aforementioned embodiment is preferred to be at a range of 20 to 30 μm with bigger particle size. To produce a bigger particle size of the luminescent composite material 10, the concentration of the reaction solution 20 is preferred to be increased to 10~1000 mmol: 20~2000 mmol for the DBATES and the sodium-containing catalyst.

Figure 6:
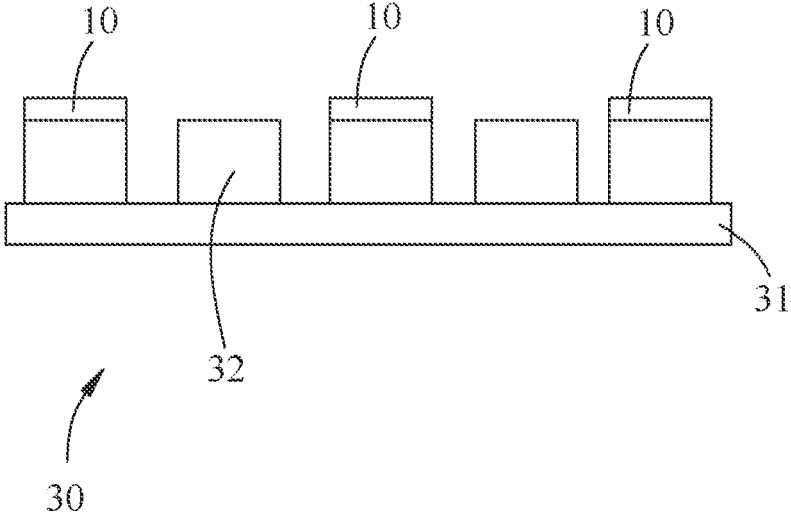
FIG. 6 is an illustration of a fourth preferred embodiment of a light emitting diode using the luminescent composite material in accordance to the present invention.

With reference to FIG. 6, a fourth embodiment of the light emitting diode 30 in the present invention is presented. In this embodiment, at least one or multiple chips 32 are disposed on the carrier 31. The luminescent composite material 10 film as mentioned in previous embodiment is further laminated onto some of the multiple chips 32 with or without the liquid crystal display (LCD) module and the barrier 35 laminated in between. As the luminescent composite material 10 film of the present invention can emit white light, multiple films could be deposited onto the all chips 32 to make the light emitting diode 30 becoming a white light emitting diode. Other twist for this embodiment, the film may be deposited onto some of the chips 32 accompanying with other colors emitting film deposited onto the remaining chips making the light emitting diode 30 becoming a multiple colors light emitting diode.

In this embodiment, the particle size of the luminescent composite material 10 is preferred to be approximately 1000 nm for a smaller particle size. To produce such smaller particle size, the concentration of the reaction solution 20 may be at a range of 1~10 mmol: 1~20 mmol for luminescent composite material 10.

<Validation Tests>

Figure 7:
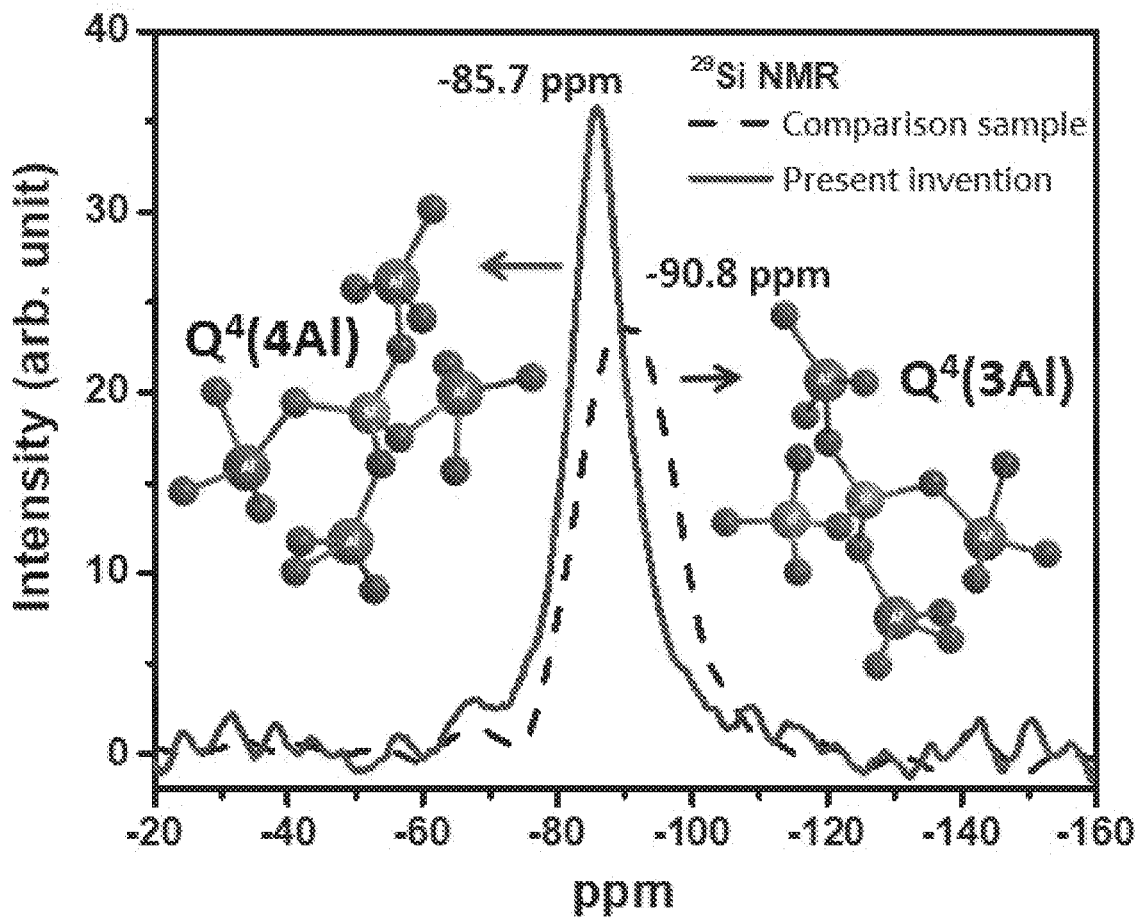
FIG. 7 is a nuclear magnetic resonance spectroscopy (NMR) image of $^{29}$Si of the luminescent composite material in accordance to the present invention compared with a comparison sample.

With reference to FIG. 7, a nuclear magnetic resonance spectroscopy (NMR) image of $^{29}Si$ of the luminescent composite material 10 and a comparison sample is presented. The embodiment of the present invention utilizes $NaBH_4$ as the sodium-containing catalyst in the reaction solution for this test. The comparison sample is a prepared from the reaction solution without the presence of the sodium-containing catalyst. In FIG. 7, it is shown that the present invention exhibits a peak of $Q^4(4Al)$ aluminum silicate at −80 ppm to −90 ppm. The comparison sample otherwise only shows a peak of $Q^4(3Al)$ aluminum silicate at −85 ppm to −95 ppm.

Figure 8:
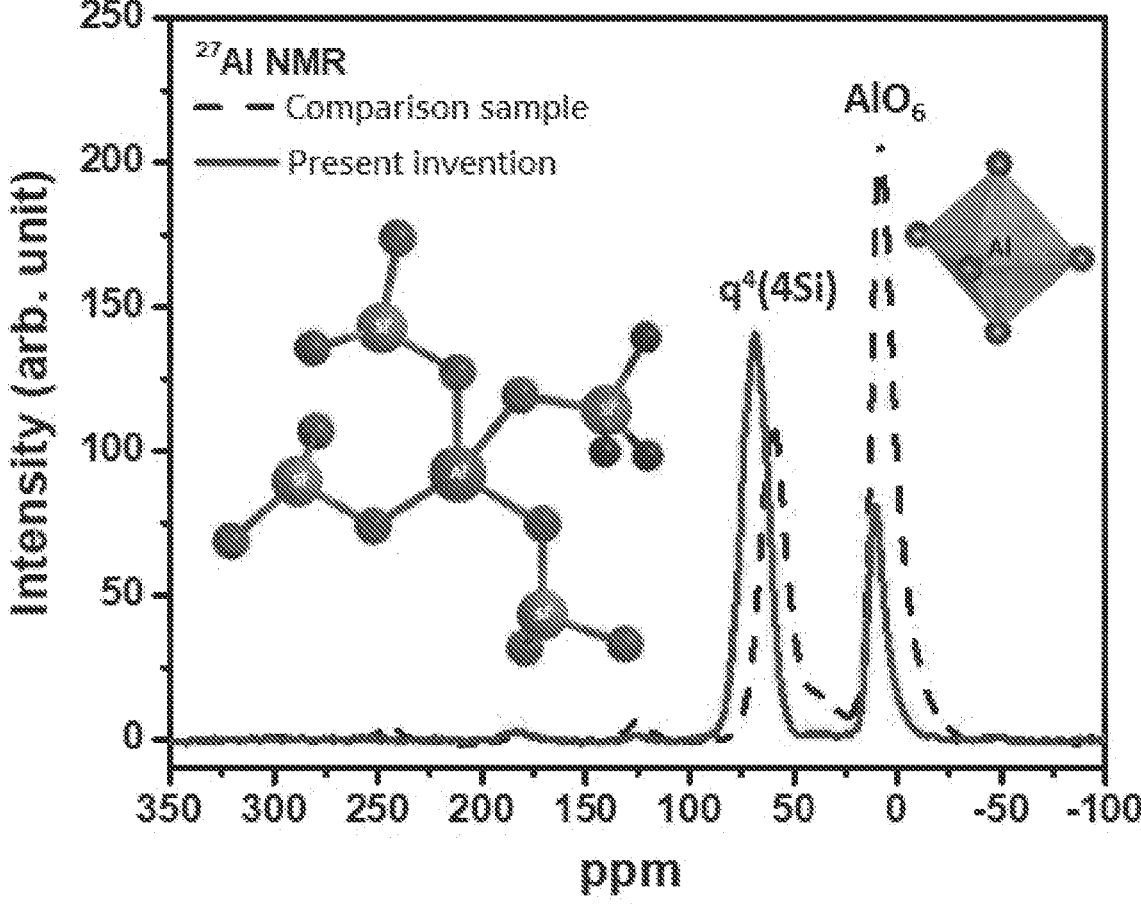
FIG. 8 is a nuclear magnetic resonance spectroscopy (NMR) image of $^{27}$Al of the luminescent composite material in accordance to the present invention compared with a comparison sample.

With reference to FIG. 8 and table 1 as below, a nuclear magnetic resonance spectroscopy (NMR) image of $^{27}Al$ of the luminescent composite material 10 and a comparison sample are presented. The present invention exhibits with a peak of $Q^4(4Si)$ aluminum silicate at −55 ppm to −75 ppm. The comparison sample otherwise shows a peak shifting to −25 ppm to 25 ppm. A internal area within the NMR peak is an a indicator of two different aluminum compounds: $AlO_4(4Si)$ and $AlO_6$. Such results indicate that the present invention provides a higher density luminescent composite material 10 than the comparison sample without the existence of the sodium-containing catalyst.

TABLE 1

| Testing Samples | Peak 1/Ratio | Peak 2/Ratio |
| --- | --- | --- |
| Comparison Sample (without the sodium-containing catalyst) | 60 ppm/39.22% | 8.3 ppm/60.78% |
| The present invention (with the sodium-containing catalyst) | 68.5 ppm/70.5% | 10.9 ppm/29.5% |

Figure 9:
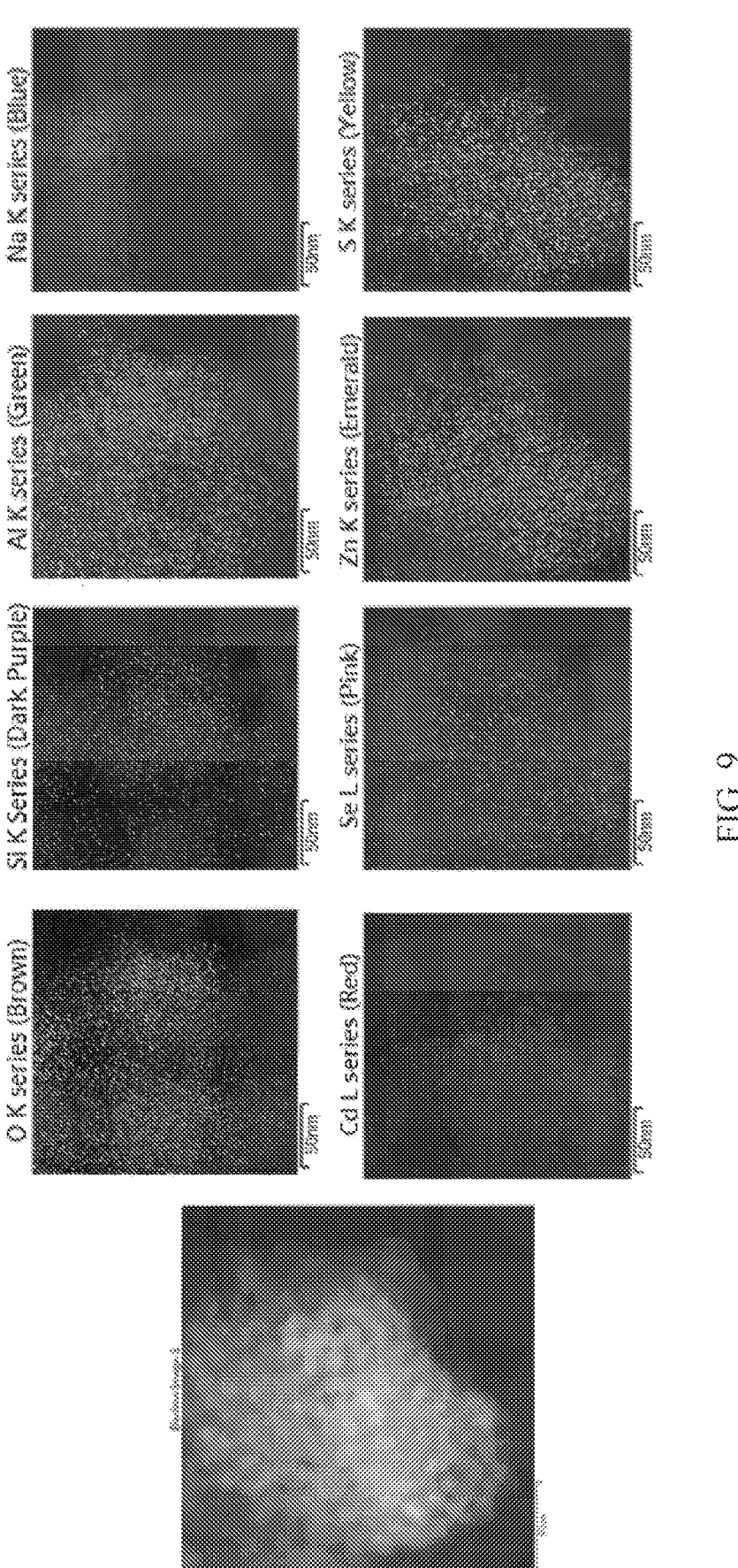
FIG. 9 is a series of scanning electron microscope (SEM) images for proving the existence of sodium element in the luminescent composite material in accordance to the present invention.

With reference to FIG. 9 and table 2 as below, a series of scanning electron microscope (SEM) images demonstrating the existence of sodium element of the present invention is presented. The elements and its atomic percentage (atomic %) of the highly dense luminescent composite material 10 are listed in table 2. In this embodiment, a ratio of the silicon element (Si) to the aluminum element (Al) is 1:2.85. However, the ratio of the silicon element (Si) and the aluminum element (Al) of the luminescent composite material 10 of the present invention for all different embodiment is preferred to be in a range of 1:2~1:4.

TABLE 2

| Element | Atomic % |
| --- | --- |
| O | 55.6 |
| Na | 2.10 |
| Al | 13.76 |
| Si | 4.83 |
| S | 10.15 |
| Zn | 11.80 |
| Se | 1.99 |
| Cd | 0.31 |

TABLE 2-continued

| Element | Atomic % |
| --- | --- |
| Total | 100 |
| Si:Al Ratio | 1:2.85 |

Figure 10:
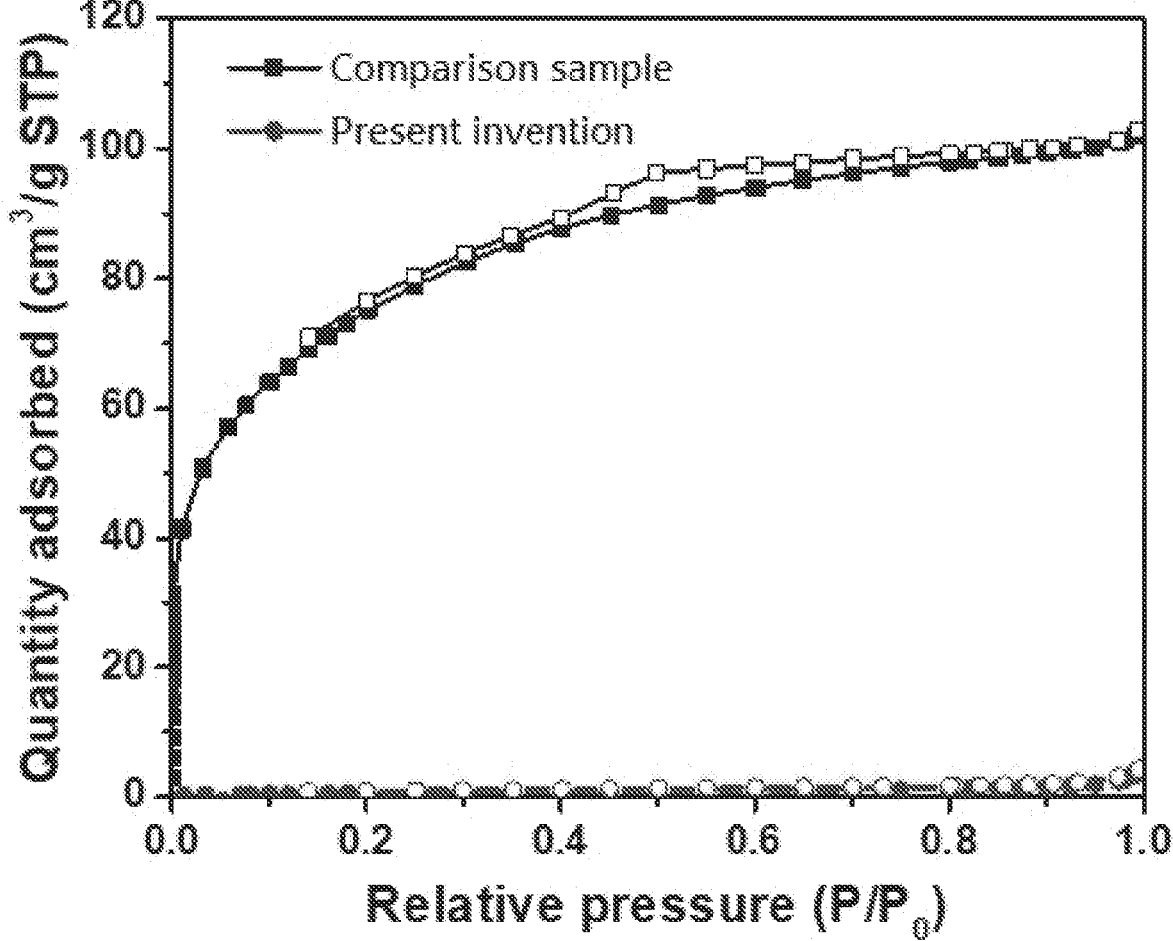
FIG. 10 is a adsorption desorption isotherms of the luminescent composite material in accordance to the present invention compared with a comparison sample.

With reference to FIG. 10 and table 3 as below, a adsorption desorption isotherms of the luminescent composite material 10 (using $NaBH_4$ as the sodium-containing catalyst) and a comparison sample (without the sodium-containing catalyst) is presented. In FIG. 10, the result indicates that the luminescent composite material 10 of the present invention exhibits and H4 type of hysteresis loop with slit shape of nanoporous structure. BET surface area, the pore volume and the size of the pore of the comparison sample without the sodium-containing catalyst are 271.94 $m^2/g$, 0.156 $cm^3/g$ and 0.6 nm. BET surface area, the pore volume and the size of the pore of this preferred embodiment show values of 2.39 $m^2/g$, 0.004 $cm^3/g$ and significantly less than 0.6 nm which indicates that the highly dense of the coating. BET surface area, the pore volume and the size of the pore of the present invention is generally in a range of 1~200 $m^2/g$, 0.001~0.1 $cm^3/g$ and significantly less than 0.6 nm, respectively.

TABLE 3

| Testing Samples | BET surface area ($m^2/g$) | Pore Volume ($cm^3/g$) | Pore Size (nm) |
| --- | --- | --- | --- |
| Comparison Sample (without the sodium-containing catalyst) | 271.94 | 0.156 | 0.60 |
| The present invention (with the sodium-containing catalyst) | 2.39 | 0.004 | Exceeding a lowest limit of the testing device (or at least lower than 0.6 nm) |

Figure 11:
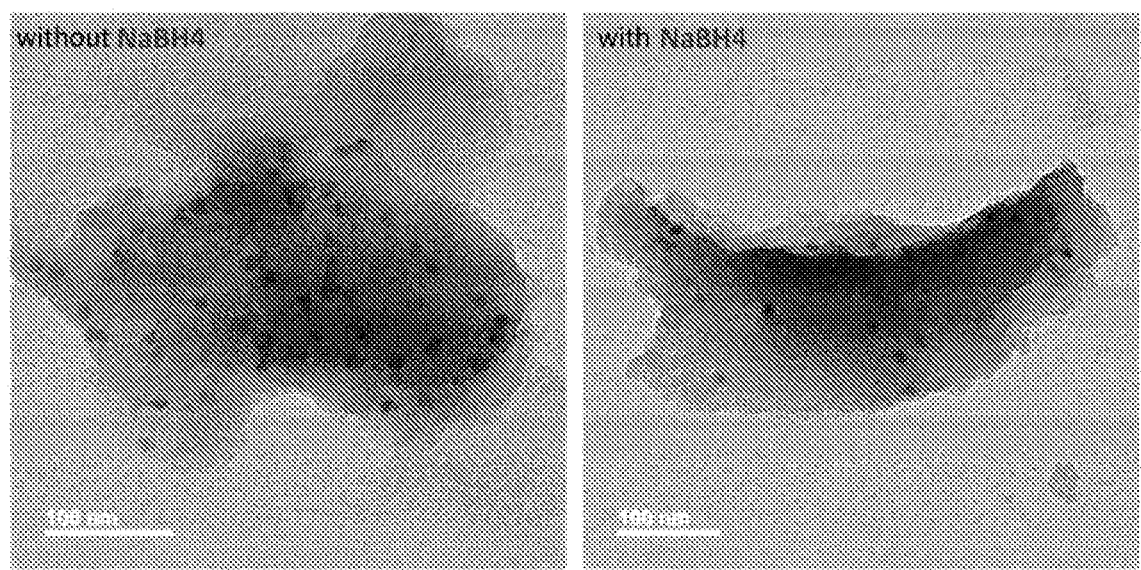
FIG. 11 is a transmission electron microscope (TEM) image of the luminescent composite material in accordance to the present invention compared with a comparison sample.

With reference to FIG. 11, a transmission electron microscope (TEM) image of the luminescent composite material 10 (using $NaBH_4$ as the sodium-containing catalyst) and a comparison sample (without the sodium-containing catalyst) is presented. A higher density of the outer coating is observed at the right side in FIG. 11 for the present invention indicating that the existence of the sodium-containing catalyst could help helps to create a higher density composite coating. The luminescent material 11 also shows exhibits a uniformly dispersed state at the right side in FIG. 11 for the present invention with uniform granule size and appearance. The average particle size of the luminescent composite material 10 in this embodiment is at falls within a range of 100 nm to 50 μm which makes the present invention became a more flexible option to produce different light emitting diode 30. Using $NaBH_4$ as the sodium-containing catalyst in this embodiment provides a faster synthesis process to create the coating 12 and achieve higher density.

Figure 12:
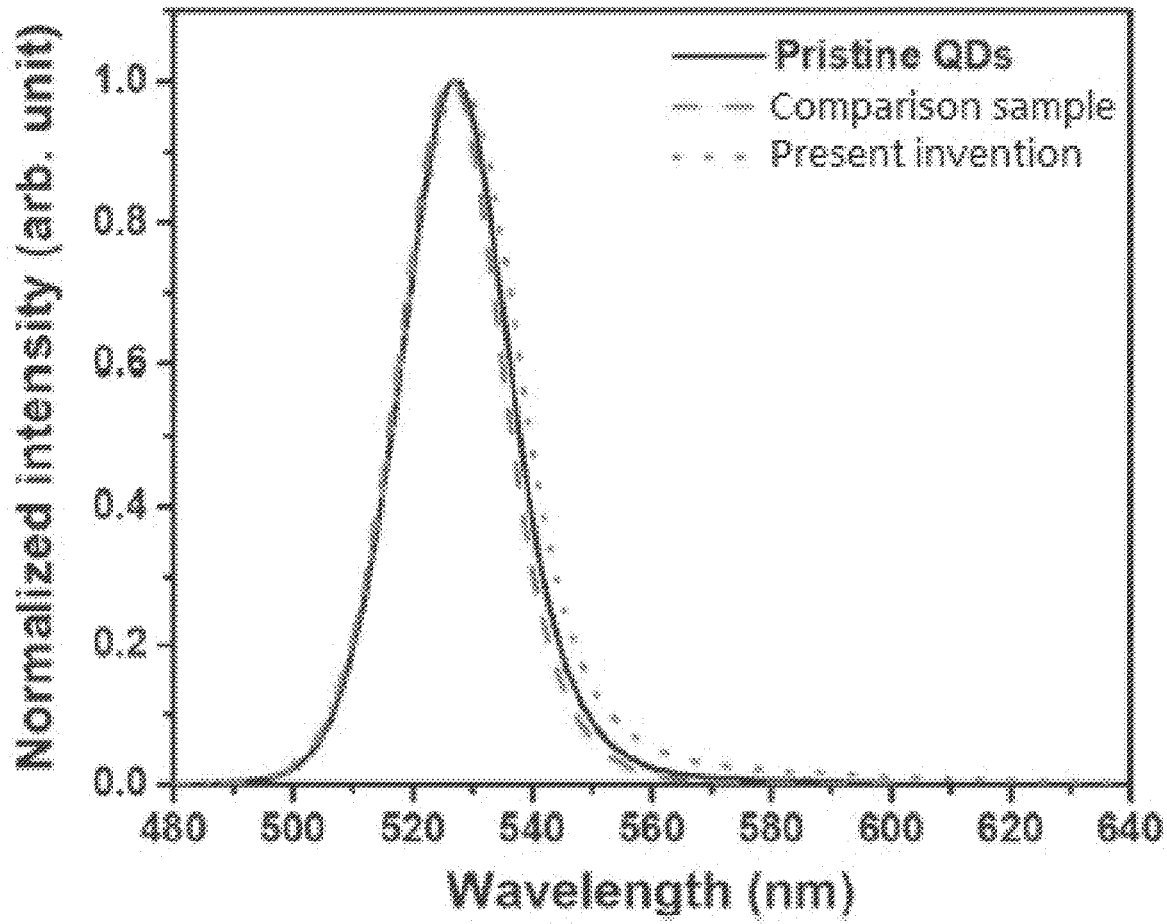
FIG. 12 is a Photoluminescence (PL) spectra of the luminescent composite material in accordance to the present invention compared with two comparison samples.

With reference to FIG. 12 and table 4 as below, a Photoluminescence (PL) spectra of the luminescent composite material 10 (using $NaBH_4$ as the sodium-containing catalyst) and two comparison samples (a pristine QDs and one without the sodium-containing catalyst) is presented. The PL spectra demonstrates that the present invention exhibits with more promising optical properties and enhances the fluorescence stability of pristine QDs. In this test, photoluminescence quantum yield (PLQY) is enhanced, indicating surface defect of the pristine QDs by the coating. The PLQY of the luminescent composite material 10 of the present invention is enhanced to approximately 1.74-fold.

TABLE 4

| Testing Samples | Emission (λ, nm) | FWHM (nm) |
|---|---|---|
| The present invention (with the sodium-containing catalyst) | 528 | 23.9 |
| Comparison sample (pristine QDs) | 527 | 22.1 |
| Comparison Sample (without the sodium-containing catalyst) | 526 | 21.3 |

Figure 13:
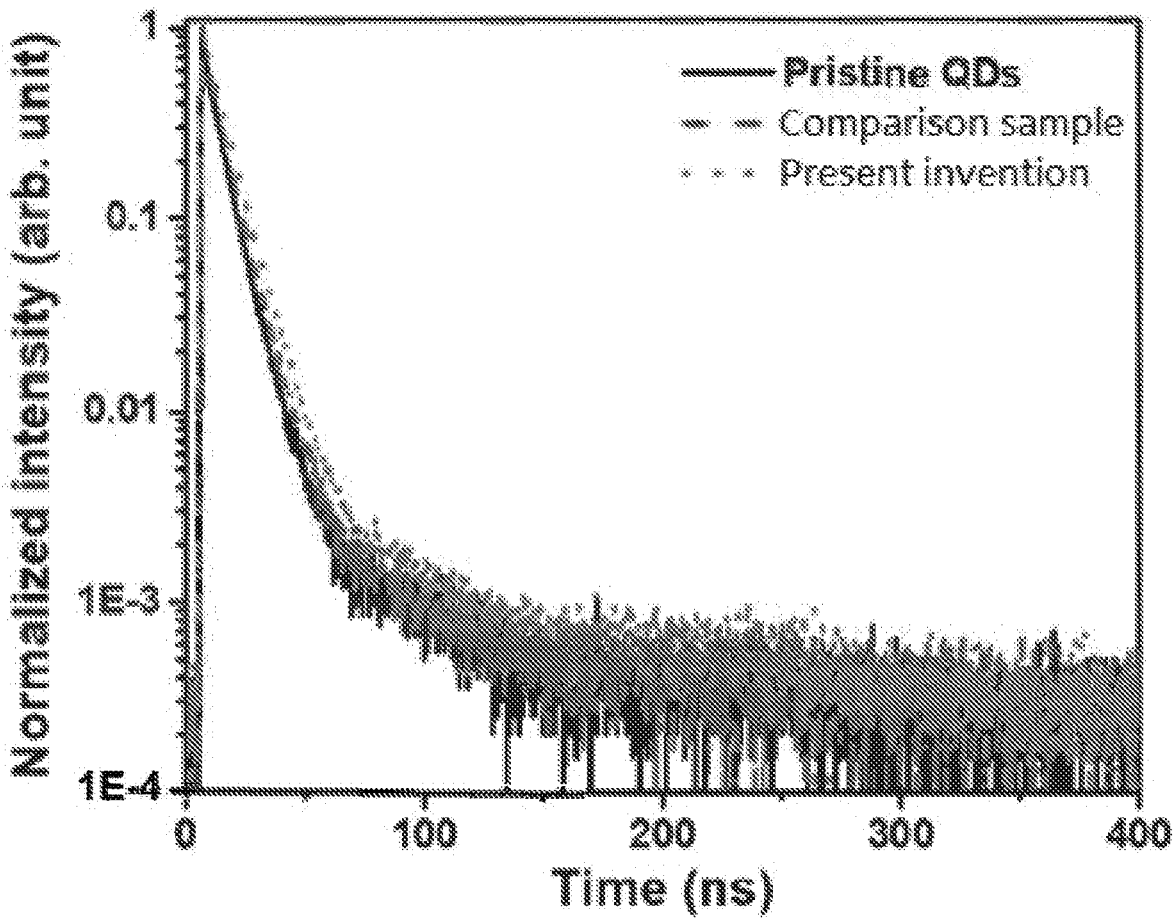
FIG. 13 is a time resolved PL (TRPL) of the luminescent composite material in accordance to the present invention compared with some comparison samples.

With reference to FIG. 13 and below table 5, a time resolved PL (TRPL) of the luminescent composite material 10 (using $NaBH_4$ as the sodium-containing catalyst) and comparison samples (pristine QDs and one without the sodium-containing catalyst) is presented to measure the fluorescence lifetime of pristine QDs before and after being coated by the coating 12. The fluorescence lifetime ($\tau_{avg}$) and PLQY results of the present invention have significantly increased.

TABLE 5

| Testing Samples | $\tau_{average}$ (ns) |
|---|---|
| Pristine QDs | 8.37 |
| Comparison Sample (without the sodium-containing catalyst) | 9.06 |
| The present invention (with the sodium-containing catalyst) | 10.60 |

Figure 14:
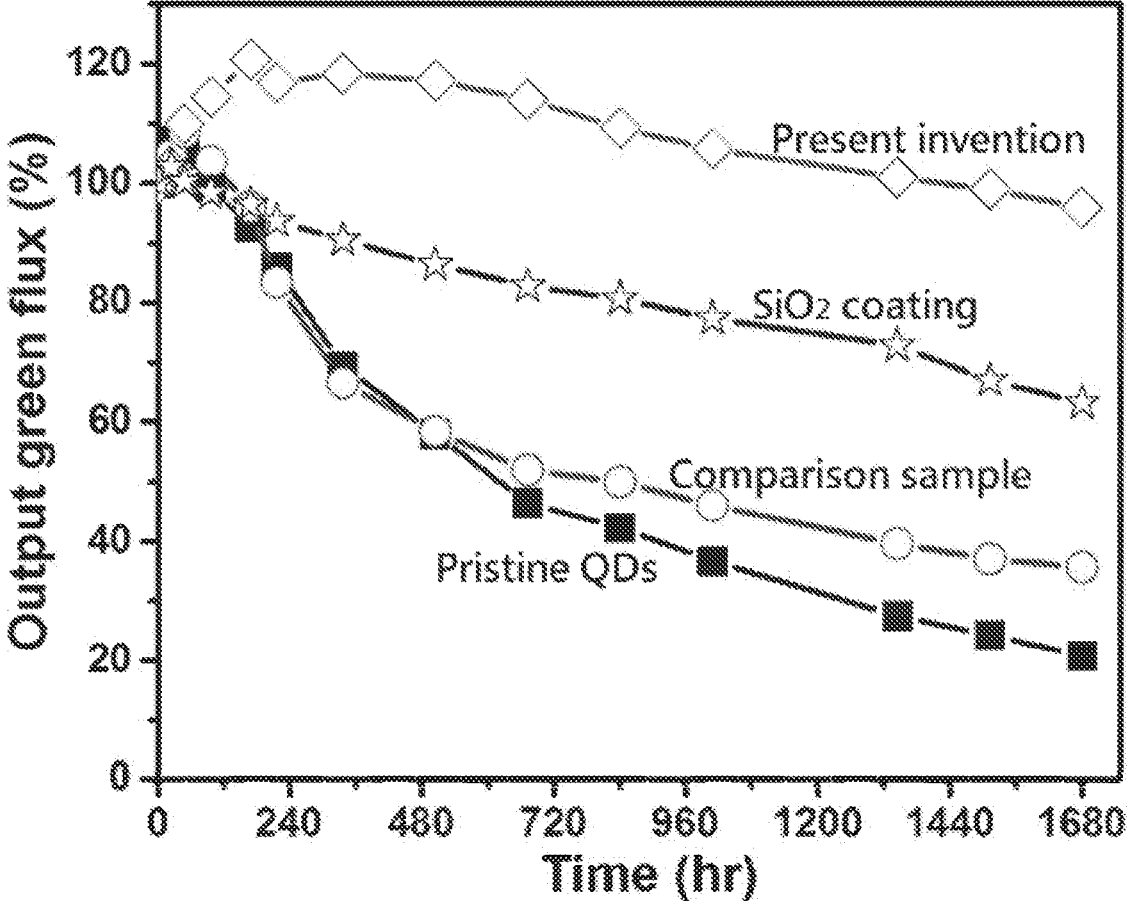
FIG. 14 is a reliability analysis of the luminescent composite material in accordance to the present invention compared with some comparison samples.

With reference to FIG. 14, a reliability analysis of the luminescent composite material 10 (using $NaBH_4$ as the sodium-containing catalyst) and comparison samples (One is pristine QDs and the other one is QDs with a coating without the sodium-containing catalyst and a conventional silicone dioxide ($SiO_2$) outer coating) is presented. The testing condition of this reliability analysis includes 30° C./60% RH, excited by a blue light with 24 mW@10 mA. In FIG. 14, the comparison samples includes pristine QDs, QDs in outer coating without sodium-containing catalyst and QDs in a conventional silicone dioxide ($SiO_2$) outer coating presenting solid square dots curve, hollow circle curve and hollow star curve. The present invention presents a hollow square dots curve in FIG. 12. The result shows that the present invention has a greatest reliability and duration.

Figure 15:
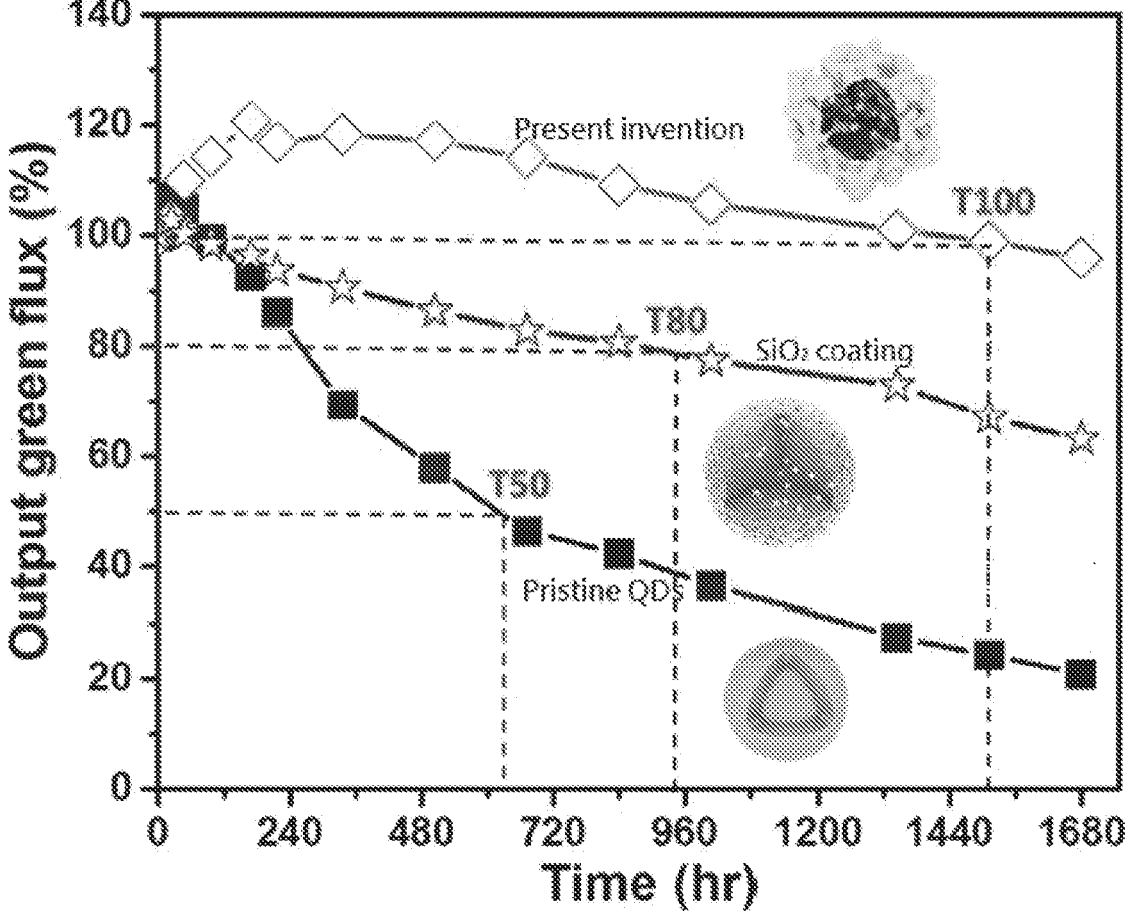
FIG. 15 is a light emitting efficiency and duration (or reliability) analysis of the luminescent composite material in accordance to the present invention compared with some comparison samples.

With reference to FIG. 15, a light emitting efficiency and duration (or reliability) analysis of the luminescent composite material 10 (using $NaBH_4$ as the sodium-containing catalyst) and some comparison samples (One is pristine QDs and the other a conventional silicone dioxide ($SiO_2$) outer coating) is presented. In FIG. 15, the comparison samples include pristine QDs and QDs in a conventional silicone dioxide outer coating presenting a solid square dots curve and a hollow stars curve. The present invention presents a hollow square dots curve in FIG. 15. The result shows that the present invention has the highest light emitting efficiency and duration.

Figure 16:
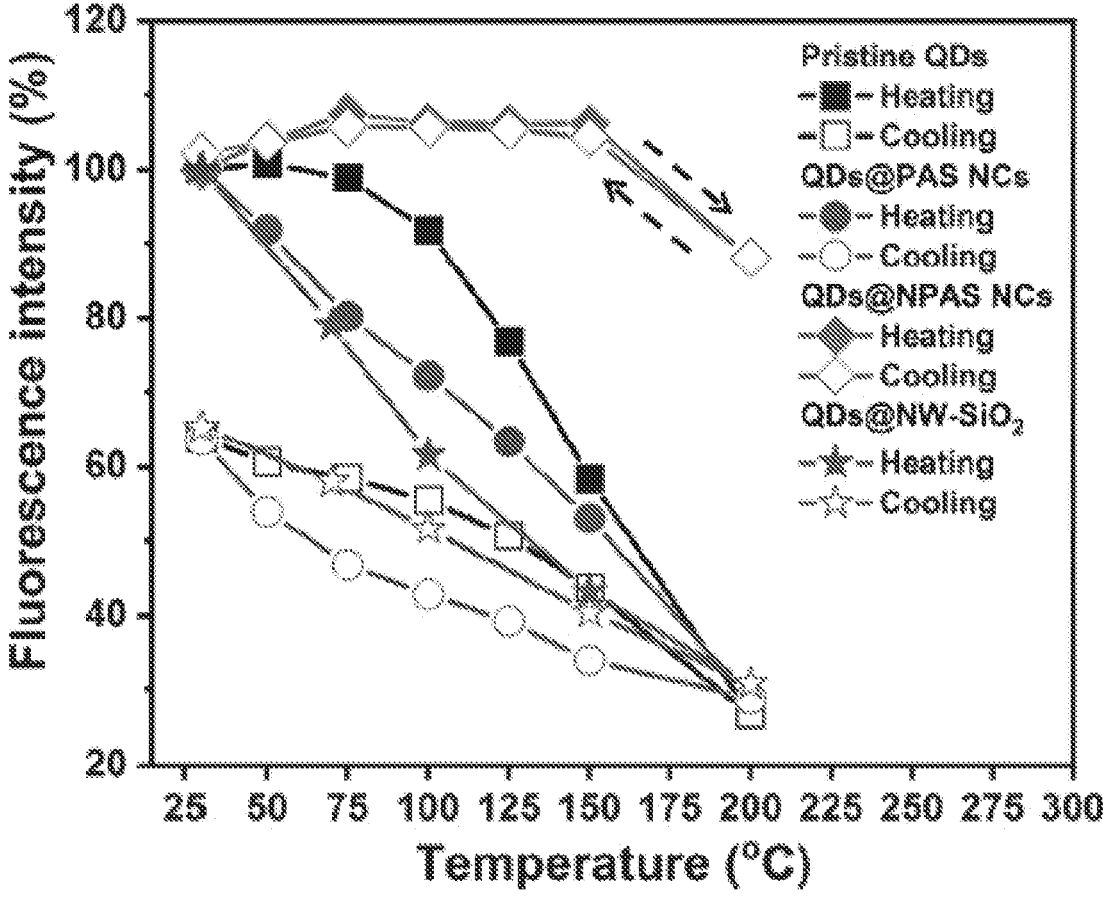
FIG. 16 is a temperature dependent fluorescence spectra of the luminescent composite material in accordance to the present invention compared with some comparison samples.

With reference to FIG. 16, a temperature dependent fluorescence spectra of the luminescent composite material 10 (using $NaBH_4$ as the sodium-containing catalyst) and some comparison samples (one is pristine QDs and the other without the sodium-containing catalyst and a conventional silicone dioxide ($SiO_2$) outer coating) is presented. When material is applied to LEDs (or specifically WLEDs) as backlights for displays, the LEDs temperature increases versus the operated driving current. In this test, the fluorescence intensity interval from 30 to 200° C. was measured to examine the thermal stability for the present invention compared to the comparison samples. As shown in the result, the present invention demonstrated excellent thermal stability compared with the other comparison samples.

The above specification, examples, and data provide a complete description of the present disclosure and use of exemplary embodiments. Although various embodiments of the present disclosure have been described above with a certain degree of particularity, or with reference to one or more individual embodiments, those with ordinary skill in the art could make numerous alterations or modifications to the disclosed embodiments without departing from the spirit or scope of this disclosure.

What is claimed is:

1. A luminescent composite material comprising: a luminescent material and a coating is coated at an outer surface of the luminescent material, wherein the coating is Na-poly(Al—O—Si) composite formed in-situ by a sol-gel reaction using di-sec-butoxyaluminoxytriethoxysilane and a sodium-containing catalyst at 15-40° C. for 10-96 hours; and wherein the Na-poly(Al—O—Si) composite has a BET surface area of 1-200 $m^2/g$ and a pore volume of 0.001-0.1 $cm^3/g$.

2. The composite material as claimed in claim 1, wherein the luminescent material comprises quantum dots or fluorescent material.

3. The composite material as claimed in claim 2, wherein the quantum dots comprises core only quantum dots, core-shell quantum dots or core-multiple shells quantum dots.

4. The composite material as claimed in claim 2, wherein the quantum dots comprise Cadmium Selenide (CdSe), Cadmium Sulfide (CdS), Cadmium Telluride (CdTe), Cadmium Zinc (CdZn), Zinc Selenide (ZnSe), Zinc Oxide (ZnO), Selenium Sulfide (SeS), Zinc Sulfide (ZnS), Zinc Telluride (ZnTe), Mercury sulfide (HgS), Mercury Selenide (HgSe), Mercury Telluride (HgTe), Indium Arsenide (InAs), Indium Phosphide (InP), Cesium Lead Halide ($CsPbX_3$, $Cs_4PbX_6$, X is Cl, Br or I) or combination thereof.

5. The composite material as claimed in claim 3, wherein the quantum dots comprise Cadmium Selenide (CdSe), Cadmium Sulfide (CdS), Cadmium Telluride (CdTe), Cadmium Zinc (CdZn), Zinc Selenide (ZnSe), Zinc Oxide (ZnO), Selenium Sulfide (SeS), Zinc Sulfide (ZnS), Zinc Telluride (ZnTe), Mercury sulfide (HgS), Mercury Selenide (HgSe), Mercury Telluride (HgTe), Indium Arsenide (InAs), Indium Phosphide (InP), Cesium Lead Halide ($CsPbX_3$, $Cs_4PbX_6$, X is Cl, Br or I) or combination thereof.

6. The composite material as claimed in claim 2, wherein the quantum dots comprise a core-shell or core-multiple shells of Cadmium Selenide/Cadmium Sulfide (CdSe/CdS), Indium Phosphide/Cadmium Selenide/Cadmium Sulfide (InP/CdSe/CdS), Cadmium Zinc/Selenium Sulfide/Zinc Sulfide (CdZn/SeS/ZnS), Indium Phosphide/Zinc Sulfide (InP/ZnS), Indium Phosphide/Zinc Selenide (InP/ZnSe), Indium Phosphide/Zinc Selenide/Zinc Sulfide (InP/ZnSe/ZnS), Indium Phosphide/Zinc Selenide/Zinc Selenium Sulfide/

Zinc Sulfide (InP/ZnSe/ZnSeS/ZnS), Silver Indium Sulfide ($AgInS_2$), Silver Indium Sulfide/Zinc Sulfide ($AgInS_2$/ZnS) or combination thereof.

7. The composite material as claimed in claim 3, wherein the quantum dots comprise a core-shell or core-multiple shells of Cadmium Selenide/Cadmium Sulfide (CdSe/CdS), Indium Phosphide/Cadmium Selenide/Cadmium Sulfide (InP/CdSe/CdS), Cadmium Zinc/Selenium Sulfide/Zinc Sulfide (CdZn/SeS/ZnS), Indium Phosphide/Zinc Sulfide (InP/ZnS), Indium Phosphide/Zinc Selenide (InP/ZnSe), Indium Phosphide/Zinc Selenide/Zinc Sulfide (InP/ZnSe/ZnS), Indium Phosphide/Zinc Selenide/Zinc Selenium Sulfide/ Zinc Sulfide (InP/ZnSe/ZnSeS/ZnS), Silver Indium Sulfide ($AgInS_2$), Silver Indium Sulfide/Zinc Sulfide ($AgInS_2$/ZnS) or combination thereof.

8. The composite material as claimed in claim 2, wherein the fluorescent material comprises Yttrium Aluminum Garnet, Lutetium Garnet, Gallium Garnet, Sulfide fluorescent powder or combination thereof.

9. The composite material as claimed in claim 3, wherein the fluorescent material comprises the fluorescent material with visible and infrared light emission, near-infrared light emission or infrared light emission ability.

10. The composite material as claimed in claim 9, wherein the fluorescent material with visible and infrared light emission ability comprises Yttrium Aluminum Garnet, Lutetium Garnet, Gallium Garnet, Sulfide fluorescent powder or combination thereof.

11. The composite material as claimed in claim 9, wherein the fluorescent material with near-infrared light emission or infrared light emission comprise a host lattice, a activator and a sensitizer, wherein:

the host lattice comprises the compound with one or any combination of the below formula 1 to 7:

$$EAGa_{12}O_{19} \quad \text{Formula 1,}$$

wherein; EA=Mg, Ca, Sr and/or Ba;

$$A_yGa_5O_{(15+y)} \quad \text{Formula 2,}$$

wherein A=Li, Na, K and/or Rb, and y=0.9-1.9;

$$AE_3Ga_2Ge_4O_{14} \quad \text{Formula 3,}$$

wherein AE=Mg, Ca, Sr and/or Ba;

$$Ln_3Ga_5GeO_{14} \quad \text{Formula 4,}$$

wherein Ln=La, Ce, Pr, Nd, Pm, Sm, Eu, Gd, Tb, Dy, Ho, Er, Tm, Yb and/or Lu;

$$Ga_2O_3 \quad \text{Formula 5;}$$

$$Ln_3Ga_{5.5}D_{0.5}O_{14} \quad \text{Formula 6,}$$

wherein D=Nb, Ge, and/or Ta;

$$Mg_4D_2O_9 \quad \text{Formula 7; and}$$

the activator and the sensitizer comprises metal ions including $Cr^{3+}$, $Yb^{3+}$, $Ni^{2+}$, $Tb^{3-}$, $Er^{3+}$ and/or $Tm^{3+}$.

12. The composite material as claimed in claim 1, wherein:

a thickness of the coating is at a range of 80 nm~49.5 μm; or a particle size of the luminescent composite material is at a range of 100 nm~50 μm.

13. The composite material as claimed in claim 2, wherein:

a thickness of the coating is at a range of 80 nm~49.5 μm; or a particle size of the luminescent composite material is at a range of 100 nm~50 μm.

14. The composite material as claimed in claim 3, wherein:

a thickness of the coating is at a range of 80 nm~49.5 μm; or a particle size of the luminescent composite material is at a range of 100 nm~50 μm.

15. A light emitting diode comprising:

a carrier;

at least one chip deposited onto the carrier;

a matrix comprising a luminescent composite material as claimed in claim 1 disposed over the chip.

16. The light emitting diode as claimed in claim 15, wherein further comprising a barrier disposed over the matrix.

17. The light emitting diode as claimed in claim 15, wherein further comprising a liquid-crystal display module disposed over the matrix.

* * * * *